May 5, 1925.
R. A. SHIMAY
1,536,156
TRACTION DEVICE
Filed Feb. 9, 1924
2 Sheets-Sheet 1
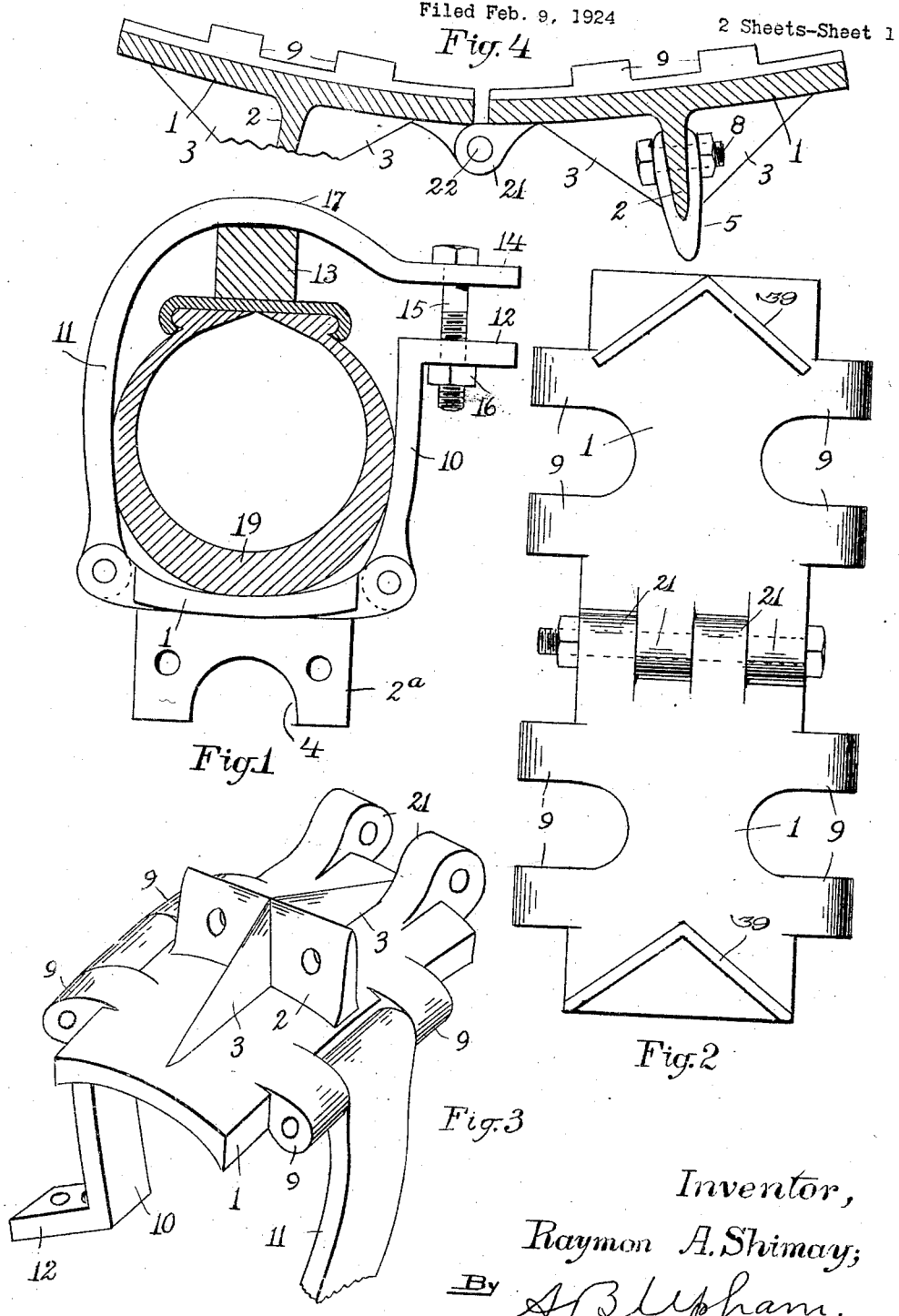
Inventor,
Raymon A. Shimay;
By A. B. Upham,
Attorney.

May 5, 1925.
R. A. SHIMAY
1,536,156
TRACTION DEVICE
Filed Feb. 9, 1924    2 Sheets-Sheet 2
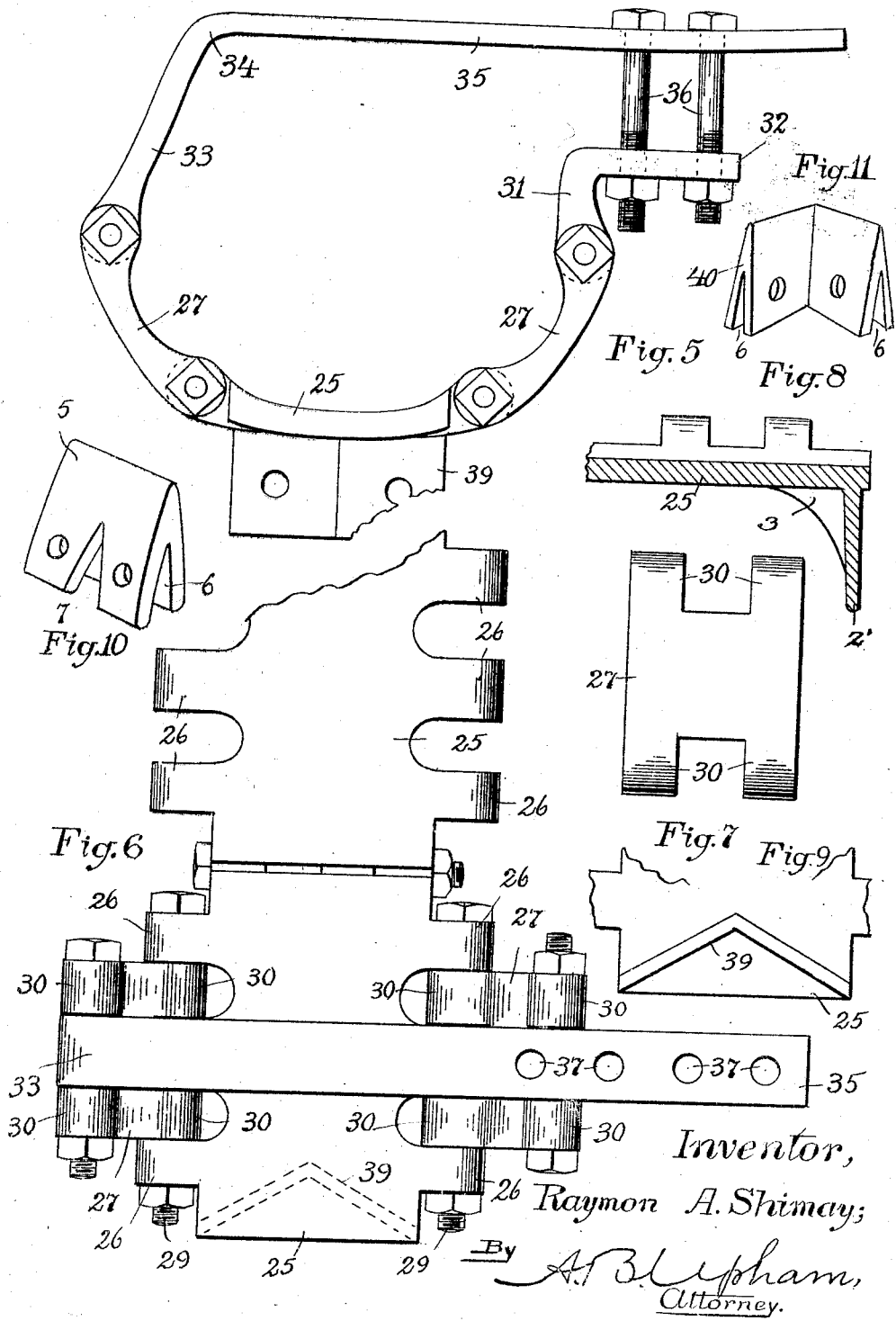

Patented May 5, 1925.

1,536,156

UNITED STATES PATENT OFFICE.

RAYMON A. SHIMAY, OF BOSTON, MASSACHUSETTS.

TRACTION DEVICE.

Application filed February 9, 1924. Serial No. 691,571.

*To all whom it may concern:*

Be it known that I, RAYMON A. SHIMAY, a citizen of the United States, and a resident of Boston, in the county of Suffolk and Commonwealth of Massachusetts, have invented certain new and useful Improvements in Traction Devices, of which the following is a full, clear, and exact specification.

The object of this invention is the construction of improved devices adapted to be attached to the felly and tire of an automobile or truck for the purpose of increasing the tractive effect of the drivers.

In the drawings, Fig. 1 is a cross section of a portion of a pneumatic tire and rim showing one form of the invention applied thereto. Fig. 2 is a plan view of another form of the device looking at its outer surface. Fig. 3 is a perspective view of one of the two members of a modification thereof. Fig. 4 is a side sectional view of the device. Fig. 5 is an end view of a form of the same designed for trucks having solid rubber tires. Fig. 6 is a plan view of the same, parts being removed and broken away. Fig. 7 is a face view of one of the links employed in the device. Fig. 8 is a side sectional view of an end of the device shown in Fig. 5. Fig. 9 is a view of the tread face of an end of the device. Fig. 10 is a perspective view of a calk-extension. Fig. 11 is a perspective view of my preferred form of calk-extension.

I prefer to make each device in two sections hinged together in order to fit tires of different diameters. As these sections are substantially duplicates of each other, I will describe one of them, and will begin with the structure illustrated in Figs. 1, 3 and 4. Each consists of a plate 1 concaved on the face designed to contact with the tire, and having calks 2 on the outer or convex face. The calk shown in Figs. 3 and 4 is located at the midlength of the plate 1, and is strengthened by braces 3, while that shown in Fig. 1 and designated as 2ᵃ is centrally recessed, as at 4 to increase its ease of penetration in ice and hard ground but has no brace 3. To aid the calks in deep snow or mud, I provide an extension therefor, as illustrated at 5 in Figs. 4 and 10. The extension 5 is notched at 6 to fit upon the calk 2, and at 7 to avoid the braces 3, and is removably held in place by bolts 8, as in Fig. 4.

At each side of the plate 1 are two ears 9 between which are pivoted the outer ends of the locking members 10 and 11. The locking member 10 is provided with an elbow 12 at its free end designed to lie parallel with the axis of the wheel on which the traction device is mounted. The locking member 11 is considerably longer and curves over the felly 13 of the wheel and has its extremity disposed to lie parallel with the elbow 12. Through this elbow and extremity 14 is passed a bolt 15 having a nut 16 thereon, which, when snugly tightened, serves to firmly clamp between the portion 17 of the member 11 and the plate 1 the felly 13 and the tire 19.

At one end of each plate 1 are a pair of ears 21 penetrated by a bolt or rivet 22 and which hinge the two plates together, as shown in Figs. 2 and 4. Thus hinged, the plates not only fit tires of different diameters, but permit of the flexing required as each section 1 is temporarily pressed up into the partly yielding tire.

In the structure illustrated in Figs. 5 and 6, the plates 25 are each provided with three ears 26 at each side to which are pivoted links 27 by means of bolts or rivets 29, each end of a link 27 having two ears 30. Between the two ears of the free ends of a link 27 is pivoted a locking member 31 having an elbow 32 substantially parallel with the axis of the wheel to which the device is to be attached. The locking member 33 is pivoted between the ears 30 of the other link 27 and is made with a bend at 34 to present its section 35 parallel with the elbow 32. A bolt 36 passing through the elbow 32 and one of the bolt holes 37 with which the section 35 is provided, enables the locking members to be drawn firmly toward each other and thereby to clamp the traction device in place. I prefer, however, to use two bolts 36 in order to render the fastening more secure. By means of the links 27 and the lengthened portion 35 with its several holes 37 (Fig. 6), the device can be applied to the heavy driving wheels of a truck provided either with a single solid tire or duo-tires.

I prefer to provide these plates with calks 39, each calk being located near the outer end of each section 25, as shown in Fig. 2, and made V-shaped as shown in Fig. 9 in order the better to hold its grip in the roadway. Fig. 8 illustrates a non-re-entrant calk 2' located at the end of a section 25.

It is preferable to apply at least two of these traction devices on each drive wheel of the car in order that they may be disposed to counterbalance each other.

In applying one of these traction devices to a wheel it is desirable to have the elbow 12 or 32 and the extension 14 or 35 come at the outside of the wheel in order to render it very much easier to introduce and tighten up the bolts 15, or 36.

Where the calks 39 are made V-shaped, with their re-entrant surfaces in advance, as shown in Figs. 6 and 9, the traction device as illustrated in Fig. 6 would be adapted for the right-hand drive wheel only, to present the terminal portion 35 outwardly.

To fit the calks 39, the calk-extensions 40 are made similarly V-shaped, as shown in Fig. 11.

Not only does the re-entrant face of the calks 39 get a better grip upon the earth, but the V-shape thereof serves the additional purpose of bracing the calks against the tractive-strains.

What I claim as my invention is:

1. A traction device comprising a plate having a calk on its exposed face, and locking members loosely connected with said plate, one locking member having an elbow substantially parallel with the axis of the wheel, and the other locking member passing over the rim of the wheel and having its terminal portion substantially parallel with said elbow, and a bolt penetrating said terminal portion and elbow and forcing them toward each other.

2. A traction device comprising a plate having a calk projecting from its exposed face and ears at each side thereof, links pivoted to said ears, a locking member having an elbow designed to be disposed parallel with the axis of the wheel for which the device is designed, the other end of said member being pivoted to one of said links, a second locking member pivoted at one end to the other of said links and having its other end disposed near to and parallel with said elbow, and a bolt joining said end and elbow.

3. A traction device comprising a plate having a calk projecting from its exposed face and three ears at each side thereof, a link having two ears at each end thereof pivoted to each set of ears, a locking member having one end pivoted between the two ears of one of said links, and having an elbow at its other end parallel with the axis of the wheel for which the device is designed, a locking device pivoted at one end between the ears of the other link and having its free end elongated and provided with a plurality of bolt holes, said end portion being disposed to lie substantially parallel with said elbow, and a bolt passing through said elbow and one of said holes for joining the parts.

In testimony that I claim the foregoing invention, I have hereunto set my hand this 7th day of February, 1924.

RAYMON A. SHIMAY.